(No Model.)
A. F. & W. MEISSELBACH.
FISHING REEL.
No. 462,360. Patented Nov. 3, 1891.
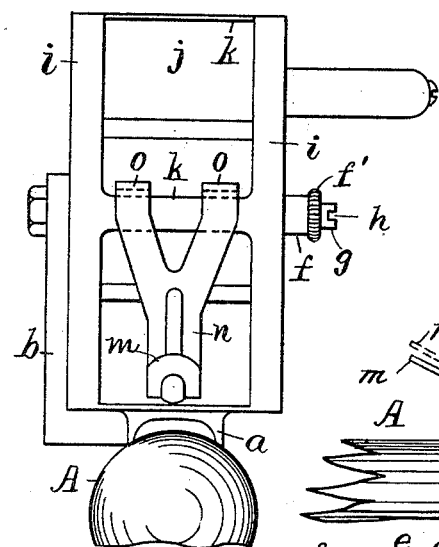
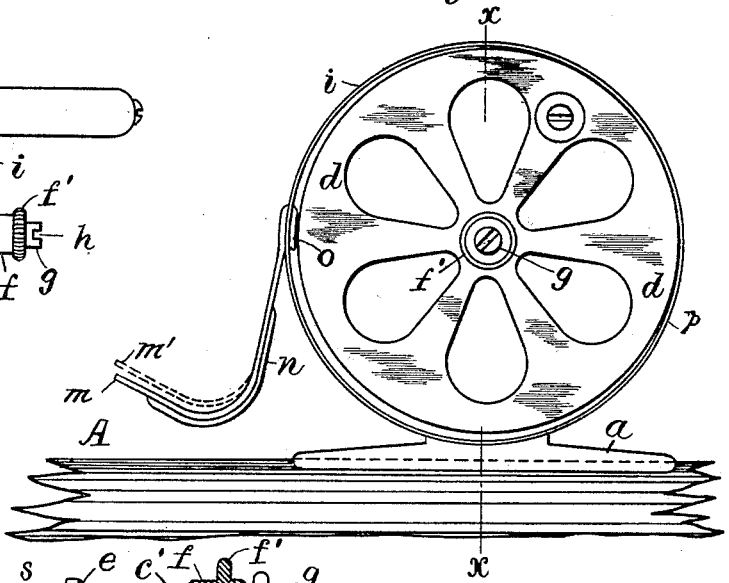
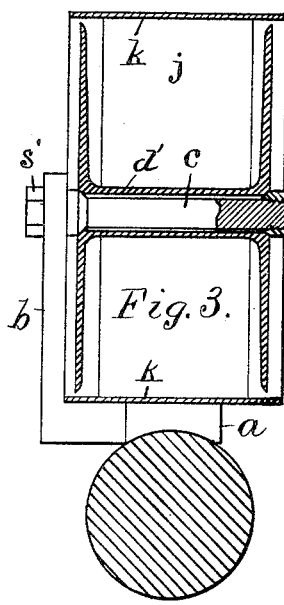
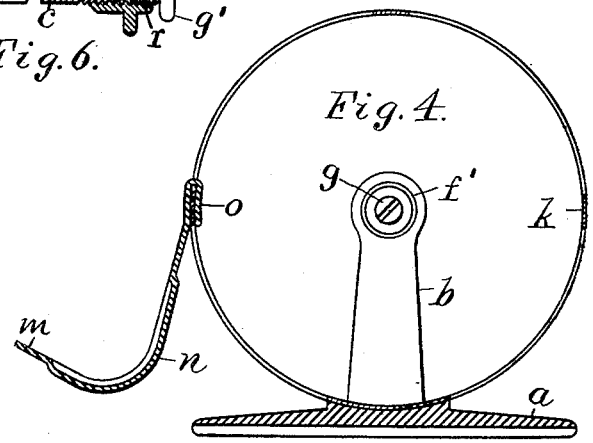
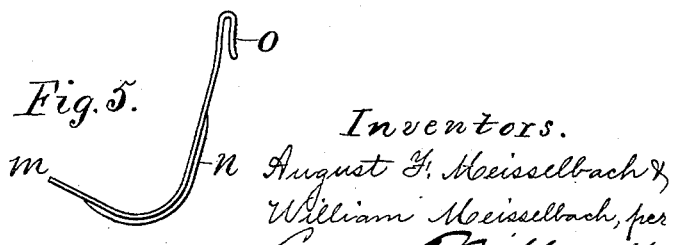
Attest:
L. Lee.
J. Van Nest Jr.
Inventors.
August F. Meisselbach &
William Meisselbach, per
Crane & Miller, attys

UNITED STATES PATENT OFFICE.

AUGUST F. MEISSELBACH AND WILLIAM MEISSELBACH, OF NEWARK, NEW JERSEY.

FISHING-REEL.

SPECIFICATION forming part of Letters Patent No. 462,360, dated November 3, 1891.

Application filed June 20, 1891. Serial No. 396,906. (No model.)

*To all whom it may concern:*

Be it known that we, AUGUST F. MEISSELBACH and WILLIAM MEISSELBACH, citizens of the United States, both residing at Newark, Essex county, New Jersey, have invented certain new and useful Improvements in Fishing-Reels, fully described and represented in the following specification and the accompanying drawings, forming a part of the same.

This invention relates to the class of reels claimed in United States Patent No. 397,198, dated February 5, 1889, in which the drag is formed as a yielding cylindrical shell encircling the flanges of the spool and designed to operate as a drag when pressed into contact with the flanges. In such drags the reel is not held in a frame with fixed cheeks, but is mounted upon a stud, from one end of which it can be removed.

The object of the present improvements is, partly, to facilitate the pressing of the yielding shell upon the flanges. This is effected by a thumb-piece attached to the shell and projected preferably adjacent to the pole, so that when the operator's fingers are placed beneath the pole his thumb may be readily applied to the thumb-piece upon the upper side of the same. The thumb-piece is preferably made detachable to facilitate the packing of the reel.

The invention also consists, partly, in the means for locking the reel upon the stud, by which it may be firmly secured when adjusted, and may also be quickly removed to exchange the reel for one bearing a line of different character. These improvements will be understood by reference to the annexed drawings, in which—

Figure 1 is an edge view of the reel with a portion of the pole. Fig. 2 is a side view of the same with a portion of the pole, with the thumb-piece depressed and the shell in contact with one side of the spool-flanges. Fig. 3 is a section of the cylindrical shell and spool on line $x\,x$ in Fig. 2, with the foot-piece and the spindle, the end of the latter, with the threaded or screw collar and set-screw, shown in section. Fig. 4 is a sectional side view of the cylindrical shell and the foot-piece with the spool removed from the stud. Fig. 5 is an edge view of the thumb-piece detached; and Fig. 6 represents a stud of alternative construction broken transversely for want of room, with the threaded collar or cone-piece in section.

A represents a portion of the fish-pole, to which the foot $a$ of the reel would be clamped by the usual means. A post $b$, projected upward from the foot, carries the stud $c$, upon which the spool $d$ is mounted. The hub $d'$ of the spool is formed as a hollow sleeve, made a little larger than the stud to form a reservoir for oil, and is held in place by a fixed conical collar $e$ at one end of the stud, and a removable collar or cone-piece $f$ screwed upon the other end. The ends of the sleeve are countersunk, and the threaded cone-piece $f$ is readily adjusted by means of the thread upon the stud to hold the spool to turn freely, but without rattling, between conical bearings. The cone-piece is formed with a milled head $f'$ to adjust it, and when set in the proper position is locked therein by a set-screw $g$, having thread the same as the spindle and fitted into the outer end of the cone-piece $f$. A slot $h$ is shown in the end of the set-screw in Fig. 3, which is made of suitable size to admit the edge of a ten-cent piece or similar small coin, by which it may be turned forcibly against the end of the spindle, and thus locks the cone-piece to prevent it from jarring loose.

The cylindrical shell $i$ is attached to the foot concentric with the stud $c$ and to make it more yielding is formed with openings $j$, between cross-bars $k$. Such openings not only make the shell more yielding, but the cross-bars between the openings furnish a convenient point for attaching the thumb-piece removably.

The thumb-piece $m$ consists in an arm formed with an elastic hook $o$ at one end adapted to clamp snugly upon one of the cross-bars $k$, and is so bent as to extend outward from the shell just above the pole A, within reach of the operator's thumb when grasping the pole below the reel. The normal position of the thumb-piece when shell is clear from the flanges of the spool is indicated in dotted lines $m'$ in Fig. 2; but the thumb-piece is shown pressed toward the pole, so as to strain the shell toward the thumb-piece and press its farther side against the flanges of the spool, as indicated at $p$. The yielding shell shown in the Patent No. 397,198 was unprovided with any means to strain it out of its normal position, but was intended to be pressed by the unassisted thumb of the operator. By the use of the thumb-piece $m$ a very much greater leverage is afforded to the operator, and the drag or brake may thus be applied to the spool with a degree of pressure graduated exactly in proportion to the requirements of the case. The hook $o$ upon the thumb-piece is shown in Fig. 1 split into two arms to hold the thumb-piece more firmly over the center of the pole. The thumb-piece is detachable from the bar $k$, as shown in Fig. 5, to facilitate the transportation of the reel compactly; but it may be attached permanently, if desired.

A hollow rib $n$ is formed by stamping into the bend of the thumb-piece, by which construction it may be made of much lighter metal to secure the desired stiffness.

The stud $c$ is shown in Fig. 6 apart from the foot $b$, with the shank $s$ for securing it in the foot by nut $s'$. The stud is drawn of larger proportions than in Fig. 3, to illustrate a modification of the invention. In this figure the set-screw $g$ is provided like the threaded collar $f$ with a milled head $g'$, which may be used to turn it instead of inserting a tool in the slot $h$. The end of the spindle is also divided by a slit $c'$, and a conical point $r$ upon the set-screw is fitted into the end of such slit, and operates when the set-screw is tightened to spread the end of the spindle within the cone-piece $f$, and thus lock the same very securely by the friction produced. The yielding shell around the spool has proved to be a very convenient combination of guard and drag, and the thumb-piece or lever $m$ furnishes a very convenient means of nicely graduating the friction exerted by the drag upon the spool, as the leverage produced by the thumb-piece permits the operator to press the drag very gradually upon the flanges of the spool.

It will be seen from the above description that the thumb-piece $m$ is adapted to engage the cross-bars of the shell, such as are described in the said United States Patent No. 397,198, and may be purchased as a separate article for use with such reels.

It will be noticed that the thumb-piece $m$ is not pivoted, nor is it provided with two arms, one of which moves through a greater distance than the other, to produce the required leverage. It does not operate, therefore, like the levers used in other brakes; but consists in a single arm which when attached to the yielding shell of the reel operates merely to distort the shell when it is pressed by the operator.

The thumb piece or lever $m$, provided with the hook $o$, forms an attachment for fishing-reels, and is therefore claimed as such herein independently of the reel.

Where the reel is provided with a yielding shell it is obvious that the thumb-piece may be engaged therewith by different means, as, for instance, the inversion of the hook shown upon the thumb-piece in the drawings, and it is therefore immaterial how such engagement is effected. As the yielding shell is necessarily attached to the foot-piece of the reel, the best point for securing the thumb-piece to the shell is upon one side of the foot-piece next the operator's thumb, about midway between the foot-piece and the top, as shown in the drawings. An application nearer to the foot-piece would require much greater force to distort the shell, and an application farther from the foot-piece would necessitate a much longer arm to bring the thumb-piece in proximity to the pole, as required. We have therefore made special claim herein to the attachment of the thumb-piece at the side of the shell.

We are aware that a conical piece has been fitted loosely upon the stud or spindle of a fishing-reel, and a nut engaging the threaded end of the spindle has been connected by a swivel-coupling to such conical piece to move the same inward and outward on the spindle.

We are also aware that conical collars in themselves are old and have been used in various constructions to form a bearing free from lost motion; but we are not aware that a screw-collar has ever been provided with a set-screw of the same size as that of the stud upon which the collar is screwed and inserted in the collar to bear upon the end of the stud. By such construction the screw-collar requires no special preparation, and the entire device may be constructed with great economy, while it possesses all the efficiency that can be desired.

By splitting the end of the stud, as shown in Fig. 6, a very slight pressure of the set-screw operates to firmly clamp the adjustable collar upon the stud.

Having thus set forth the nature of the invention, what is claimed herein is—

1. A fishing-reel having the stud $c$, provided at one end with a fixed collar and at the other end with the screw-collar $f$, fitted to a thread upon the end of the stud, and having a set-screw $g$, inserted in the end of the screw-collar to bear upon the end of the stud, as and for the purpose set forth.

2. A fishing-reel having the stud $c$, provided at one end with a fixed collar and at the other end with the screw-collar $f$, provided with milled head $f'$ to turn the same, and having the set-screw inserted in the end of the screw-collar to bear upon the end of the stud, and provided with a notch for turning the same, substantially as set forth.

3. A fishing-reel having the stud $c$, provided at one end with a conical collar $e$ and formed at the other end with the slit $c'$ and external thread, and having the conical screw-collar $f$, fitted to such thread, and the set-screw $g$, inserted in the end of such collar with a conical point to penetrate the slit, as and for the purpose set forth.

4. The combination, with a fishing-reel having a foot-piece for application to a pole and the spool encircled by a yielding shell, of a thumb-piece attached to such shell at one side of the foot-piece and projected toward the pole within reach of the operator's thumb, and adapted to distort the shell when pressed laterally, substantially as herein set forth.

5. In a fishing-reel, the combination, with a flanged spool, of a yielding shell encircling the same and having openings $j$ with cross-bars $k$, and the thumb-piece $m$, provided with hook $o$ to embrace the cross-bar $k$ and bent in proximity to the foot of the reel, as and for the purpose set forth.

6. A thumb-piece adapted to engage with the yielding shell of a fishing-reel, and consisting in the bent arm $m$, provided at one end with the hook $o$, adapted to engage with a thin cross-bar upon such shell, as and for the purpose set forth.

AUGUST F. MEISSELBACH.
WILLIAM MEISSELBACH.

In the presence of—
L. LEE,
H. J. MILLER.